D. MORIARTY.
TIRE MOUNTING FOR VEHICLE WHEELS.
APPLICATION FILED MAY 24, 1916.
1,279,402.
Patented Sept. 17, 1918.
2 SHEETS—SHEET 1.
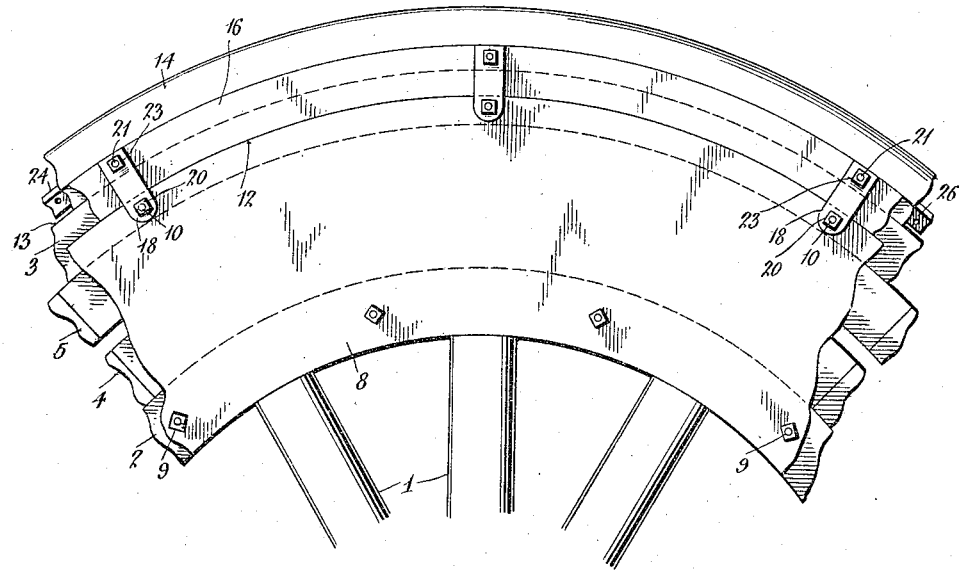
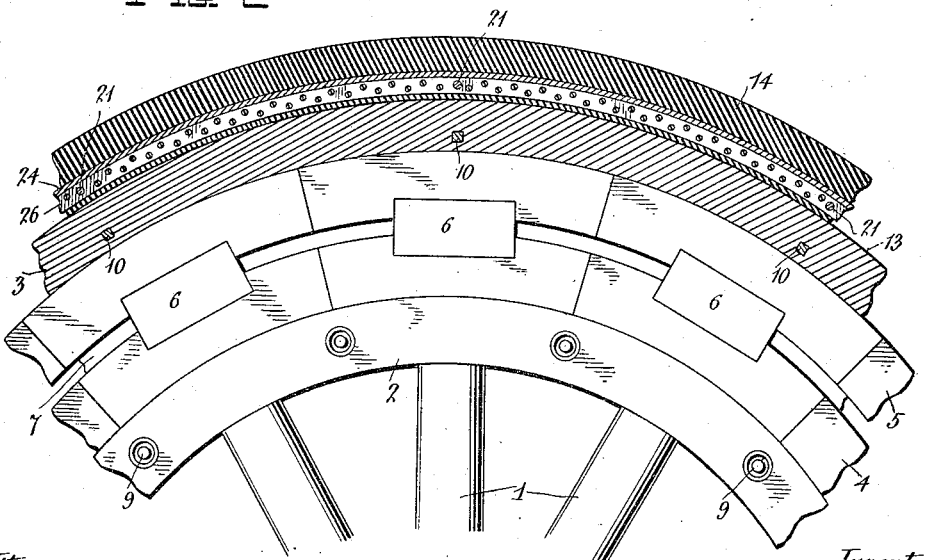

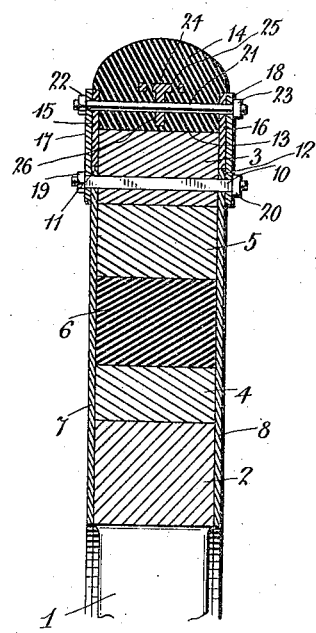
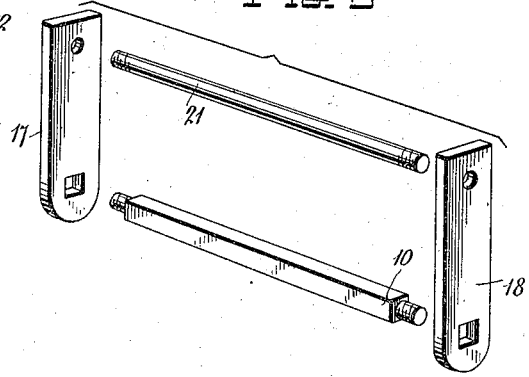
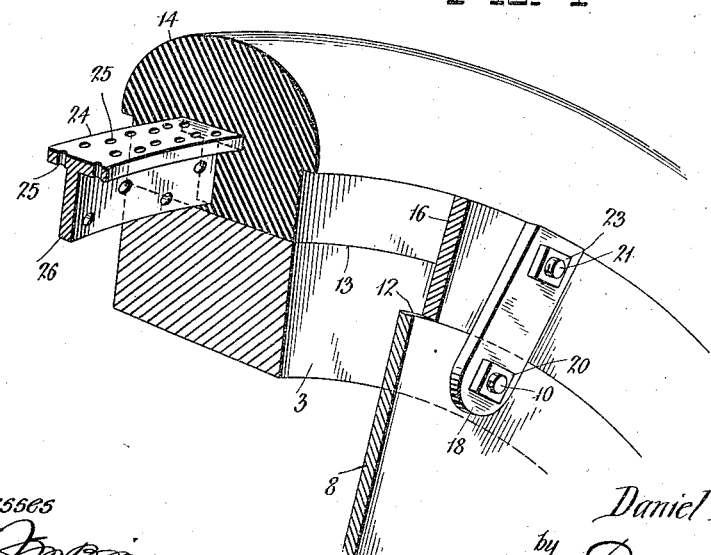

UNITED STATES PATENT OFFICE.

DANIEL MORIARTY, OF NEW ORLEANS, LOUISIANA.

TIRE-MOUNTING FOR VEHICLE-WHEELS.

1,279,402.　　　　Specification of Letters Patent.　　Patented Sept. 17, 1918.

Application filed May 24, 1916. Serial No. 99,674.

*To all whom it may concern:*

Be it known that I, DANIEL MORIARTY, a citizen of the United States, residing at New Orleans, in the parish of Orleans and State of Louisiana, have invented new and useful Improvements in Tire-Mountings for Vehicle-Wheels, of which the following is a specification.

My present invention relates to improvements in vehicle wheels, and it pertains more especially to means for mounting and securing the tire upon the rim of the wheel, particularly where solid rubber tires are employed.

The primary objects of the invention are to provide means whereby the tire can be easily and quickly applied and removed relatively to the wheel rim and to so secure the tire upon the rim as to prevent detachment or breaking thereof, the tire, according to the present invention, being so constructed and retained on the rim as to insure uniformity in wear throughout the life of the tire.

The invention is especially applicable to a cushion wheel of the type shown and described in my prior Patent No. 1,114,506, granted October 20, 1914, it providing relatively simple and efficient means for mounting and retaining the tire whereby a tire may be applied or removed easily and quickly without disturbing the flanges or disks which confine the elastic cushions.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 shows, in side elevation, a portion of a vehicle wheel of the type shown and described in my prior patent aforesaid, the wheel being provided with the improved means for mounting and retaining a tire thereon.

Fig. 2 represents a section taken in the plane of the wheel as shown in Fig. 1.

Fig. 3 represents a transverse section through the periphery of the wheel and showing the tire and its mounting and retaining means in cross-section.

Fig. 4 is a perspective view of a portion of the wheel rim, the tire, and the tire mounting and retaining means, and Fig. 5 is a collective view of parts composing the tire retaining means.

Similar parts are designated by the same reference characters in the several views.

The present invention is applicable to vehicle wheels of various kinds. It is shown and will be described as applied to a wheel of the type disclosed in my prior patent above mentioned, and it may be used to particular advantage in wheels of that type. It is to be understood, however, that the invention is not restricted in its application to wheels of the particular type mentioned, and also that the invention is not restricted to the precise construction shown, as equivalent constructions will be included within the scope of the claims.

In the present instance the wheel is constructed as shown and described in my prior patent, it being sufficient to state herein that the spokes 1 are connected at their outer ends by an inner felly 2, that the wheel embodies an outer felly 3, that series of segmental recessed blocks 4 and 5 are fitted between the inner and outer fellies, and that bodies 6 of rubber or other flexible or elastic material are interposed between the blocks and engage in the recesses thereof. The flexible or elastic bodies 6 which serve as cushions, and also the blocks 4 and 5 between which these cushions are interposed are confined in position laterally and retained in proper relation to the inner and outer fellies 2 and 3 by plates, disks or flanges 7 and 8 which are applied to the opposite sides of the inner and outer fellies, bridging the space between these fellies and thereby confining the cushions 6 and the blocks 4 and 5 laterally. These plates, disks or flanges, according to the present invention, are secured to the inner and outer fellies by bolts 9 and 10 of suitable number and size. The plates, disks or flanges 7 and 8, however, according to the present invention, overlie the outer felly 3 for only a portion of the radial extent of this outer felly, the outer edges or peripheries 11 and 12 of the plates 7 and 8 being shown at a point about midway of the radial dimension of the outer felly.

The periphery of the outer felly 3 provides a seat 13 upon which the inner circumference of the tire 14 rests, the tire shown in the present instance being solid and composed preferably of rubber. A pair of flanges 15 and 16 are provided to retain the tire from lateral displacement relatively to the outer felly 3. These flanges 15 and 16 are detachably mounted on the outer felly and they are formed preferably of rings of a depth to lie against the sides of the outer felly 3 and to project outwardly a suitable distance beyond the periphery of the outer felly, the projecting portions of these flanges forming, with the periphery of the felly 3, a channel or groove to contain and confine the tire. In the construction shown, the inner circumferences of the detachable flanges 15 and 16 are of a size to just fit over the outer circumferences 11 and 12 of the plates or disks 7 and 8. When the detachable flanges 15 and 16 are removed, the tire may be readily applied and removed relatively to the outer felly by a relative lateral movement. Means is provided for securing the flanges 15 and 16 in place upon the felly to prevent lateral displacement of the tire and to sustain lateral thrust between the tire and the wheel. As shown, the bolts 10 serve this purpose in conjunction with bars or cleats 17 and 18 which latter are clamped at their inner ends beneath the heads or nuts 19 and 20 on the bolts 10, these bars or cleats extending radially and outwardly past the peripheries of the plates or disks 7 and 8 and overlapping the detachable flanges 15 and 16. The outer ends of the bars or cleats are clamped against the flanges 15 and 16, and these flanges are held from spreading by bolts 21 which are of a suitable number and extend through the flanges 15 and 16 and the bars or cleats 17 and 18. Heads or nuts 22 and 23 are provided on the ends of each bolt 21 to serve as means for detachably securing the flanges 15 and 16 and the bars or cleats 17 and 18 in proper relation.

According to the present invention, the bolts 21 also serve to hold the tire upon the felly, that is to say, to prevent the inner periphery or circumference of the tire from leaving its seat 13 formed by the outer felly. For this purpose, the tire is cast or otherwise formed with an anchor bar 24 which is preferably in the form of a continuous ring and of substantially T-shape in cross-section, the flanges of the anchor bar being formed with perforations 25 to permit the rubber composing the tire to enter these perforations and thereby key the anchor bar effectually within the tire and to avoid interruption in the continuity of the structure of the tire due to the presence of this anchor bar. The base flange 26 of the anchor bar lies in the plane of the tire, and the bolts 21 pass through the tire and through these flanges 26 of the anchor bar. With this construction, the bolts 21 serve to detachably fasten the bars or cleats 17 and 18 and in turn the detachable flanges 15 and 16, and they perform the further function of holding the tire firmly upon the seat 13 formed by the periphery of the outer felly. In order to prevent turning of the bars or cleats 17 and 18 which might permit creeping or relative rotation of the tire relatively to the wheel felly, the bolts 10 are preferably formed square or angular in cross-section, and the openings in the plates 7 and 8 and the openings in the bars or cleats 17 and 18 through which the bolts 10 extend are also formed square or of a corresponding cross-section whereby the bolts 10 will be firmly held from rotation and in turn the bolts will prevent rotation of the bars or cleats 17 and 18.

Tire mounting and retaining means embodying the present invention is relatively simple and inexpensive and it holds the tire firmly upon the wheel felly, with the result that loosening and consequent breaking of the tire is avoided and the wear of the tire is uniform throughout its circumference during the life of the tire. Removal of a tire for repair or replacement may be accomplished easily and quickly, it being necessary only to unclamp and remove the cleats and the detachable flange at either side of the wheel. The detachable feature of the present invention is particularly advantageous in that it avoids the necessity of stretching the tire in placing the same upon the wheel, and hence the tire can be cured before application of the same to the wheel instead of requiring curing of the tire after the same has been applied to the wheel.

I claim as my invention:—

1. The combination with a wheel felly having tire retaining flanges at the opposite sides thereof, of a tire having an annular anchor member contained wholly and concentrically within the tire and carried by the tire as the latter is applied to and removed from the felly, the inner circumference of the tire being continuous from side to side thereof, and devices connecting said flanges and coöperating with said anchor member when the tire is applied to the felly.

2. The combination with a wheel felly having tire retaining flanges at the sides thereof, of a rubber tire having embedded therein an annular anchor member T-shaped in cross-section with the base flange thereof directed inwardly toward the inner circumference of the tire, the inner circumference of the tire being continuous from side to side and uninterrupted by said anchor member, the anchor member being carried by the tire as the latter is applied to and removed from the felly, and tire retaining devices connecting the flanges and extending through the base portion of the tire and through the inwardly directed base flange of the anchor member.

In testimony whereof I have hereunto set my hand in presence of two subscribing witnesses.

DANIEL MORIARTY.

Witnesses:
E. S. COUSIN,
A. D. KNAPP.

Copies of this patent may be obtained for five cents each, by addressing the "Commissioner of Patents, Washington, D. C."